United States Patent

[11] 3,612,631

[72] Inventor   Ward F. O'Connor
                Denville, N.J.
[21] Appl. No.  41,393
[22] Filed      May 28, 1970
[45] Patented   Oct. 12, 1971
[73] Assignee   The Lummus Company
                Bloomfield, N.J.

[54] OIL MIST LUBRICATION
     7 Claims, 3 Drawing Figs.
[52] U.S. Cl. .................................................. 308/78,
                                                    308/187
[51] Int. Cl. ..................................................... F16c 3/14,
                                                    F16C 33/66
[50] Field of Search .......................................... 308/187, 1;
                                                    417/241; 184/69; 388/78

[56]            References Cited
            UNITED STATES PATENTS
2,986,433   5/1961   Herrmann .................... 308/187

Primary Examiner—Edgar W. Geoghegan
Assistant Examiner—Frank Susko
Attorney—Marn and Jangarathis ABSTRACT: Lubrication of bearings by the placing of a sonic generator in a bearing housing to provide a continuous mist or fog of oil within the housing to lubricate the bearings.

PATENTED OCT 12 1971 3,612,631
Fig. 1.
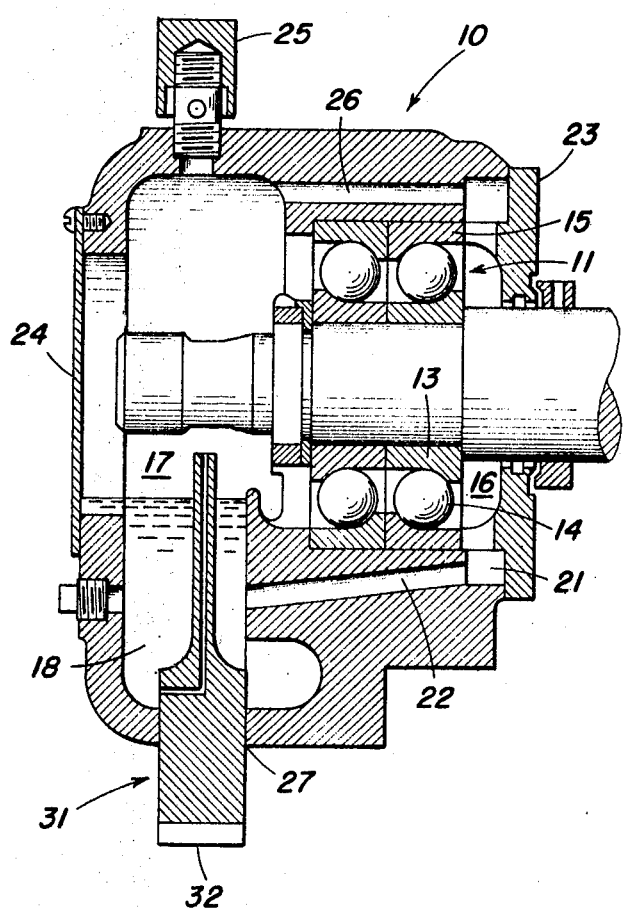
Fig. 2.
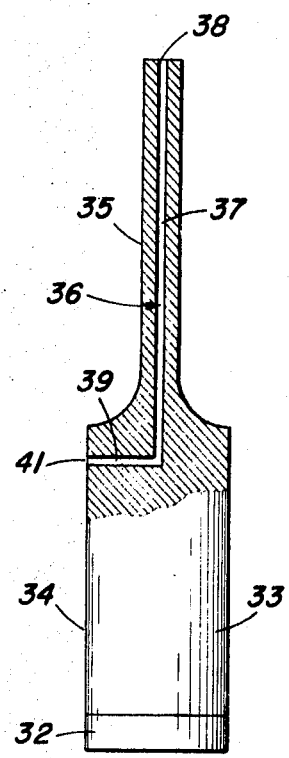
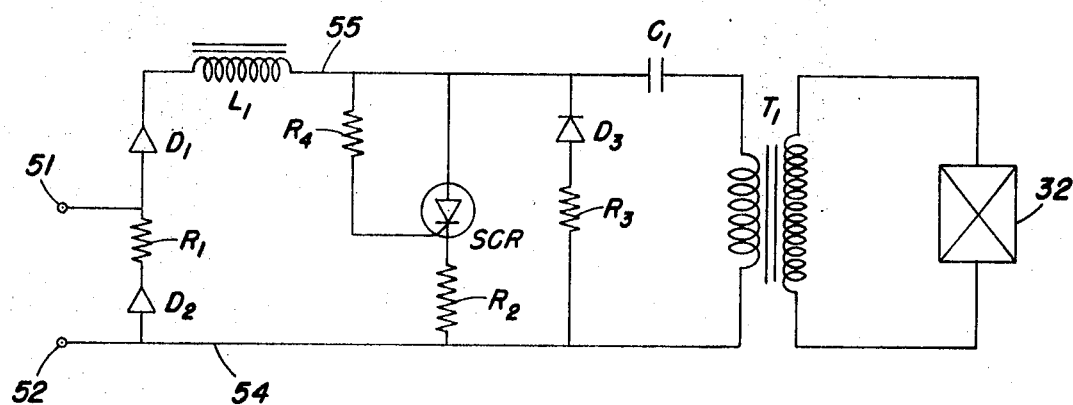
Fig. 3.
INVENTOR.
Ward F. O'Connor
BY
Marn & Jangarathis
ATTORNEYS

OIL MIST LUBRICATION

This invention relates to the lubrication of bearings for machinery, in particular high speed machinery. Still more particularly, this invention relates to oil mist lubrication of bearings.

There are several methods for applying lubricating oil to bearings, including oil ring spray; drop feed; wick feed; and oil mist or fog lubrication. In recent years, there has been considerable interest in oil mist or fog lubrication, but the systems devised to date are both complicated and costly, thereby making effective use of oil mist lubrication almost prohibitive.

An object of this invention is to provide for improved oil mist lubrication.

Another object of this invention is to provide for lubrication of bearings by oil mist or fog.

These and other objects of the invention should be readily apparent from the following description thereof when read with reference to the following drawings wherein like parts are designated by like numerals and wherein:

FIG. 1 is a partially cross-sectional view of the bearing structure including the sonic generator;

FIG. 2 is a side view of the sonic generator; and

FIG. 3 is a diagram of an embodiment of a circuit which may be used with the generator of FIG. 2.

The objects of this invention are broadly accomplished by inserting a sonic mist generator in a bearing housing with the inlet of the generator being placed in the oil reservoir to draw oil therefrom. The sonic generator atomizes the oil thereby maintaining a continuous oil mist or fog in the housing which lubricates the bearings.

This invention will be described in more detail with reference to the accompanying drawings which are illustrative of an embodiment of the invention, but it is to be understood that the scope of the invention is not to be limited thereby.

Referring now to FIG. 1, there is shown a bearing housing 10 containing bearings 11 rotatably supporting a shaft 12. The housing 10 supports and surrounds the bearing 11, conventionally comprised of an inner race 13, rolling elements or balls 14 and outer race 15, the housing 10 including a space 16 at the outer side of bearing 11, and a chamber 17 at the inner side of bearing 11, the bottom portion of the chamber 17 defining a sump or reservoir 18. The space 16 is in fluid flow communication with the sump 18 through vertical passage 21 and downwardly inclined passage 22, the passages 21 and 22 returning oil from space 16 to the sump 18.

The shaft 12 extends through a cover 23 closing the housing 10 and is operatively connected to suitable machinery (not shown), for example, a pump, compressor, turbine or the like. The side of the housing 10 opposite to cover 23 is also closed by a suitable plate or cover indicated as 24.

The upper portion of the housing 10 is provided with an oil vent 25 and a horizontally disposed oil vent passage 26, which places the upper portion of chamber 17 in communication with the upper portion of space 16, thereby preventing any pressure buildup and permitting flow of mist to chamber 16.

A sonic oil mist generator 31 is inserted into the chamber 17 through an appropriate opening 27. The sonic oil mist generator, as shown in more detail in FIG. 2, is comprised of an electromechanical transducer means, such as a piezoelectric material 32, bonded to an electrically conductive resonator 33, such as aluminum, comprised of a base portion 34 to which the piezoelectric material is bonded, and an elongated top portion 35 of narrower cross section than the base portion 34. The resonator includes an L-shaped passage 36 comprised of an elongated portion 37 which extends axially through top portion 35 terminating in an outlet 38 at the top surface thereof, and a shorter portion 39 which extends radially through the base portion 32 terminating in an inlet 41 at the outer periphery thereof. The sonic generator 31 is inserted into the chamber 17 with the piezoelectric material 32 outside the chamber 17, the inlet 41 of passage 36 being below the oil level in sump 18 and the outlet 38 of passage 36 being above the oil level in sump 18, whereby oil may be drawn into the passage 36 through inlet 41 and released through outlet 38 as a fine mist into the portion of chamber 17 above sump 18.

The crystal 32 is connected to suitable circuitry which causes the crystal 32 to vibrate, whereby oil is drawn into the sump 18 through the passage 36 of the generator 31 and is atomized at the outlet 38 thereof. The sonic generator 31 continuously maintains a mist or fog of oil in the chamber 17, and the rotation of the shaft 12 carries oil through the bearings 11 to effect continuous lubrication thereof. THe oil which has passed through the bearings 11 is returned to the reservoir 18 through passages 21 and 22.

A suitable circuit for effecting vibration of the crystal is schematically illustrated in FIG. 3, but it is to be understood that the scope of the invention is not limited thereby in that other suitable circuitry may be devised by one skilled in the art.

Referring now to FIG. 3, there is shown a schematic diagram illustrating an exemplary embodiment of a driver circuit suitable for use in conjunction with the sonic mist generator according to the present invention. As is shown in FIG. 3, the exemplary driver circuit comprises input terminal means 51 and 52, rectifier means $D_1$ and $D_2$, coil means $L_1$, a silicon controlled rectifier SCR, capacitor means $C_1$, transformer means $T_1$ and a piezoelectric crystal 32. The input terminal means 51 and 52 are adapted to be connected to a standard source of voltage such as a 110 volt, 60 cycle supply as is commonly available at a wall outlet or the like. The input terminal 51 is connected intermediate the rectifier means $D_1$ and $D_2$ and the input terminal means 52 is connected to the anode of the rectifier means $D_2$. The rectifier means $D_1$ and $D_2$ may take the form of conventional semiconductor diodes and are connected in series in a manner such that positive half-cycles of the input signal applied to input terminal means 51 will be applied to the coil means $L_1$ through rectifier means $D_1$ while negative half-cycles of such input signals will be applied to conductor 54 through a current limiting resistor $R_1$ and rectifier means $D_2$. The coil means $L_1$ may take the form of an iron core inductor or any other circuit means capable of regulating the rate at which current flows in the illustrated driver circuit. THe coil means $L_1$ is connected in series with the anode of the silicon controlled rectifier SCR, the cathode of diode means $D_3$ and the capacitor means $C_1$. The capacitor means $C_1$ may be entirely conventional in form and is selected to have a value so that the tank circuit formed therewith, as described below, will oscillate at 25 kilocycles. The capacitor means $C_1$ is connected in series with the primary of the transformer means $T_1$ which may take the form of an iron core step-up transformer having a secondary winding comprising a sufficient number of turns to produce a 200 volt output in response to the application of 110 volts to the input terminal means 51 and 52. The piezoelectric crystal 32 is connected, as illustrated in FIG. 3, across the secondary of the transformer means $T_1$, and may be formed of any known material capable of producing a mechanical force upon the application of a voltage thereto so that ultrasonic energy may be produced therefrom. Although piezoelectric crystals have been disclosed in specie herein, it will be obvious to those of ordinary skill in the art, that ferroelectric, magnetostrictive or other well-known forms of transducer material may also be used.

The serial combination formed by the capacitor means $C_1$ and the primary of the transformer $T_1$ is connected in parallel with both the series branch formed by the resistor $R_2$ and the silicon controlled rectifier SCR and the series branch circuit formed by diode means $D_3$ and resistor $R_3$. THe diode means $D_3$ may take the form of a zener diode or other conventional form of breakdown diode exhibiting a zener or reverse voltage breakdown at a selected voltage. The capacitor means $C_1$, the primary of the transformer $T_1$ together with the reflected impedance value thereof and the resistor $R_3$ from a tank circuit whose component values are chosen so that the resulting circuit formed will oscillate at 25 kilocycles. The silicon controlled rectifier means SCR may take the conventional form of this well-known semiconductive device which acts to selectively pass or inhibit current flow therethrough depending upon the value of voltage applied to a gate electrode thereof. THe gate electrode of the silicon controlled rectifier means SCR is connected to the coil means $L_1$ through a relatively large resistor $R_4$ so that said silicon controlled rectifier means SCR is selectively enabled at a voltage which is higher than that selected for the breakdown of diode means $D_3$. The cathode of the silicon controlled rectifier means SCR is connected in series to the current limiting resistor $R_2$ so that the current passing therethrough to the conductor 54 is limited to a predetermined value.

In the operation of the embodiment of the driver circuit depicted in FIG. 3, it will be appreciated that upon the application of an input signal of 110 volts, 60 cycles to the input terminal means 51 and 52, each of the positive half cycles therein will be applied to the coil means $L_1$ through rectifier means $D_1$ while each negative half-cycle thereof will be attenuated by the current limiting resistor $R_1$ and applied through rectifier means $D_2$ to the conductor 54. As each positive half-cycle of the input signal is applied to the coil means $L_1$, the inductance exhibited by such coil means $L_1$ will tend to oppose the flow of current associated with that positive half cycle of the input signal and hence tend to impede current flow toward the capacitor means $C_1$. Thereafter, during the positive half cycle, as current begins to flow in conductor 55, the capacitor $C_1$ will begin to charge in the well-known manner. When charge on the capacitor means $C_1$ reaches the zener or reverse breakdown voltage value selected for the diode means $D_3$, during the application of a given positive half-cycle of the input signal thereto, the diode means $D_3$ will breakdown and allow the capacitor means $C_1$ to discharge therethrough thereby releasing energy to the oscillating tank circuit formed by the capacitor means $C_1$, the resistor $R_3$ and the primary of the transformer means $T_1$. The tank circuit as thus formed will begin to oscillate in the well-known manner to thereby produce a 25 kilocycle waveform burst in the primary winding of the transformer means $T_1$. The 25 kilocycle waveform burst thus applied to the primary of the transformer means $T_1$ is coupled to the secondary winding thereof in the well-known manner so that the 25 kilocycle waveform burst produced thereby is increased in magnitude to a value of 200 volts. The 200 volt, 25 kilocycle waveform burst produced at the secondary of the transformer means $T_1$ is thus applied across the piezoelectric crystal 32 to cause mechanical forces to be produced thereby in the usual manner.

Shortly after the breakdown of the diode means $D_3$ during a given positive half-cycle of the input signal, the voltage across resistor $R_4$ will increase to a value which is sufficient to trigger on or enable the silicon controlled rectifier means SCR. When the silicon controlled rectifier means SCR is enabled, virtually all of the current applied to conductor 55 through the coil means $L_1$ will pass through the silicon controlled rectifier means SCR and the current limiting resistor $R_2$ to conductor 54. Therefore, at the instant when the silicon controlled rectifier means SCR is enabled, the tank circuit formed by the capacitor means $C_1$, the primary of the transformer $T_1$ and the resistor means $R_3$ will receive no more input energy and hence the 25 kilocycle oscillations produced thereby will subsequently die out due to the attenuation of the oscillating energy therein by the resistive portion of such tank circuit.

Upon the completion of the positive half-cycle of the input signal under discussion, the silicon controlled rectifier means SCR will be disabled and a negative half-cycle of the input signal will be applied through the current limiting resistor $R_1$ and the rectifier means $D_2$ to the conductor 54. As such negative half-cycle will not apply energy to the tank circuit, no output signal will be produced by such negative half-cycle and hence the piezoelectric crystal 32 will not receive a burst of 200 volt, 25 kilocycle energy during the application of a negative half-cycle of the input signal to the input terminal means 51 and 52.

Upon the termination of a negative half-cycle of the input signal applied to input terminal means 51 and 52, a positive half-cycle of such input signal will again be applied to the input terminal means 51 and 52. This positive half-cycle of the input signal will again cause capacitor means $C_1$ to charge thereby causing the reverse breakdown of diode means $D_3$ and the subsequent enabling of the silicon controlled rectifier means SCR in the previously described manner. Accordingly, when these conditions again obtain the tank circuit formed by the capacitor means $C_1$, the primary of the transformer means $T_1$ and resistor $R_3$ will be driven into oscillation and thereby cause the application of a 200 volt, 25 kilocycle waveform burst across the piezoelectric crystal 32. Thus, as each positive half-cycle of an input signal is applied to input terminal means 51 and 52, the piezoelectric crystal 32 will receive a 200 volt, 25 kilocycle waveform burst while no energy application is received thereby during negative half-cycles of said input signal. Therefore, it will be seen that in the exemplary embodiment of the piezoelectric driver circuit depicted in FIG. 3, a 200 volt, 25 kilocycle waveform burst will be applied across the piezoelectric crystal 32 during each positive half-cycle of the input signal applied to input terminals 51 and 52 and that the duration of such 200 volt, 25 kilocycle waveform burst will be shorter than the positive half-cycle of the input signal associated therewith, thereby causing the crystal 32 to exhibit periodic mechanical vibrations which is translated to the resonator of the sonic mist generator to which the crystal is attached.

The exemplary driver circuit hereinabove described with reference to FIG. 3 is a preferred circuit for operating the sonic oil mist generator of the present invention for lubrication of bearings, but it is to be understood that the invention is not to be limited to such an exemplary circuit as many alternatives thereto will be readily apparent to those of ordinary skill in the art. For instance, although the exemplary circuit depicted in FIG. 3 applies bursts of energy to the piezoelectric crystal 32, it will be appreciated that driver circuitry could be employed which applies energy to the piezoelectric crystal 32 on a continuous basis. Furthermore, although the foregoing description of FIG. 3 has assumed the availability of a standard source of alternating current, it will be readily apparent to those of ordinary skill in the art that a portable battery supply could be utilized in combination with chopper means or the input to the exemplary circuit of FIG. 3 could be modified in the well known manner to directly accommodate a DC input.

The lubrication system may also include a wide variety of other devices generally used in the art, such as constant level oilers, oil throwers, and the like, provided a sonic generator is employed to maintain a continuous oil mist in the bearing housing. It is to be understood that the shaft and bearings may be constructed other than as particularly described. Thus, for example, the shaft, bearings and housing may be of the type employed for driving a pump or compressor with a turbine, in which case the shaft would extend through both sides of the housing, and contain two sets of bearings, with the shaft being connected at one end to the turbine and at the other to the pump or compressor. The oil mist or fog produced by the sonic generator lubricates both sets of bearings. These constructions and others should be apparent to those skilled in the art and are within the spirit and scope of the invention provided such constructions include a sonic generator to provide oil mist lubrication of the bearings.

Numerous modifications and variations of the present invention are possible in light of the above teachings and, therefore, within the scope of the appended claims the invention may be practiced other than as particularly described.

What is claimed is:

1. In a bearing housing having a shaft rotatably supported by bearings therein, said housing including an oil reservoir, the improvement comprising: a sonic generator, including an inlet and an outlet, positioned in the housing, said inlet being in said reservoir to draw oil therefrom, and said outlet being positioned in the housing above said reservoir, whereby said generator maintains an oil mist in the housing for lubricating the bearings.

2. The bearing house as defined in claim 1 wherein the bearing includes an inner race and an outer race and balls supported thereby, one side of said bearing defining with the housing a first chamber, the lower portion of said first chamber defining the oil reservoir, the other side of said bearing defining with the housing a second chamber, the shaft extending through the bearing into the first and second chamber; passage means connecting the second chamber with said resevoir to return oil which has passed through the bearing to the resevoir, said outlet of the sonic generator extending into the upper portion of the first chamber to maintain an oil mist in said upper portion.

3. The bearing housing as defined in claim 2 wherein the sonic generator is comprised of a base portion, a top portion and an electromechanical transducer means connected to the base portion, said sonic generator including a passage extending from the sonic generator inlet positioned in the base portion to the sonic generator outlet positioned in the top portion.

4. The bearing housing as defined in claim 3 wherein said sonic generator additionally includes driver circuit means connected to said electromechanical transducer means for applying electrical input energy thereto, said driver circuit means comprising:

an oscillatory tank circuit electrically coupled to said electromechanical transducer means; and means for applying input signals to said oscillatory tank circuit.

5. The bearing housing as defined in claim 4 wherein said electromechanical transducer means is formed of piezoelectric material.

6. The bearing housing as defined in claim 5 wherein said oscillatory tank circuit is coupled by transformer means to said electromechanical transducer means and includes therein diode means exhibiting a predetermined reverse breakdown potential.

7. The bearing housing as defined in claim 6 wherein said means for applying input signals to said oscillatory tank circuit comprises:

means for applying input signals of only one polarity to said oscillatory tank circuit; and means connected in parallel with said oscillatory tank circuit for selectively shunting said input signals of only one polarity away from said oscillatory tank circuit to thereby selectively disable the application of input signals thereto.